United States Patent [19]

O'Neal et al.

[11] 3,840,147

[45] Oct. 8, 1974

[54] SHELF APPARATUS FOR HELIX TYPE PRODUCT DISPENSING MACHINES

[75] Inventors: Wilbert O. O'Neal; Burford J. Page, both of Independence, Mo.; Charles E. Simek, Overland Park, Kans.

[73] Assignee: The Vendo Company, Kansas City, Mo.

[22] Filed: July 5, 1973

[21] Appl. No.: 376,624

[52] U.S. Cl. .............................................. 221/75
[51] Int. Cl. ............................................ G07f 11/52
[58] Field of Search ....................... 221/75, 79–81, 221/242

[56] References Cited
UNITED STATES PATENTS

| | | | |
|---|---|---|---|
| 2,272,682 | 2/1942 | Srodulski | 221/242 |
| 3,057,511 | 10/1962 | Mannhardt | 221/75 |
| 3,085,711 | 4/1963 | Holstein | 221/75 |
| 3,294,281 | 12/1966 | Schlaf | 221/75 |
| 3,335,907 | 8/1967 | Holstein | 221/75 |
| 3,601,281 | 8/1971 | Schlaf | 221/75 |
| 3,653,540 | 4/1972 | Offutt | 221/75 |

Primary Examiner—Robert B. Reeves
Assistant Examiner—Thomas E. Kocovsky
Attorney, Agent, or Firm—Schmidt, Johnson, Hovey & Williams

[57] ABSTRACT

The rotatable, product feeding helix of a drawer assembly for a general merchandising machine is connected to its drive at the rear of the assembly through a spring-loaded, releasable coupler that permits the helix to be manually rotated when the coupler is released so as to index the discharge terminus of the helix to a position appropriate for the size and shape of the product to be dispensed. Two forms of resilient, product deflectors are presented that serve to prevent tumbling of the products as they are successively pushed off the assembly into the product drop space of the machine, and two forms of ejectors at the terminus of the helix assure that the leading product is fully pushed from the assembly during each dispensing cycle. Laterally adjustable side guides on the assembly permit the effective width of the receiving area of the assembly to be varied in accordance with the dimensions of the product to be dispensed.

16 Claims, 14 Drawing Figures

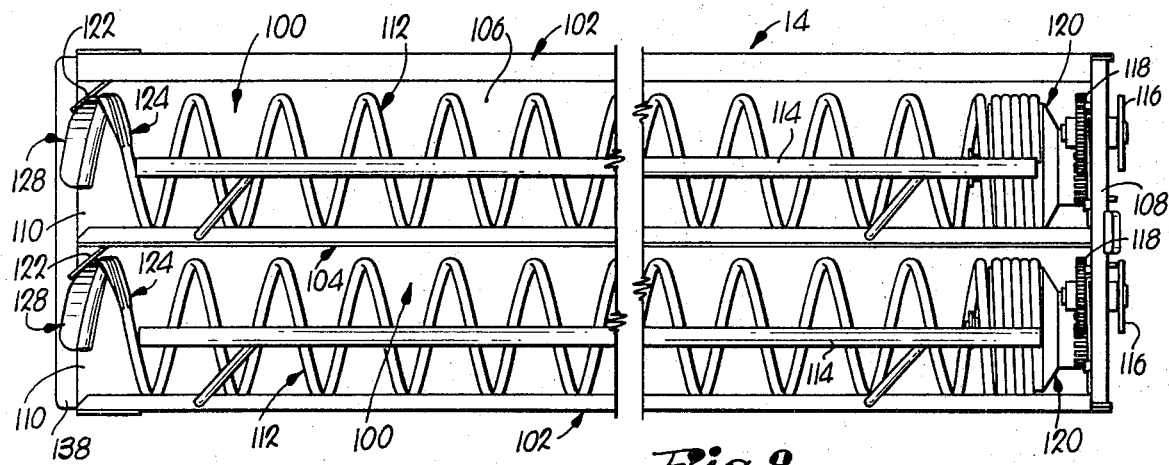
Fig.8.
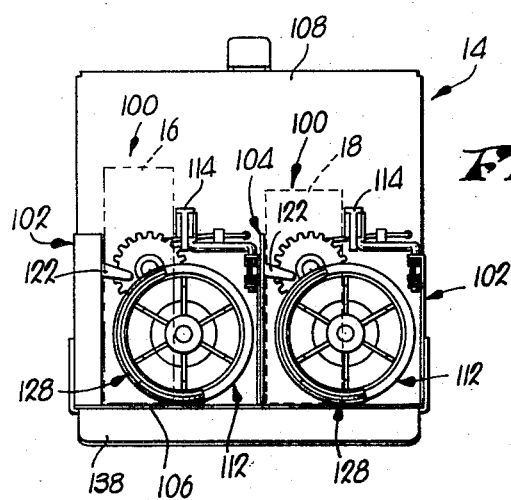
Fig.9.
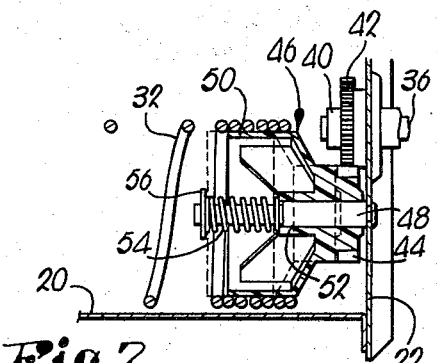
Fig.7.
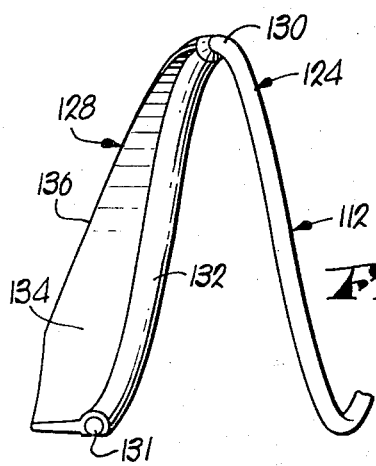
Fig.13.
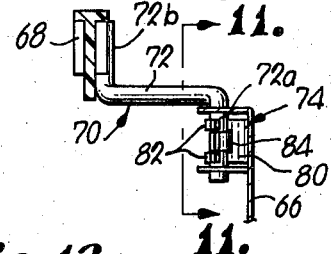
Fig.10.
Fig.11.
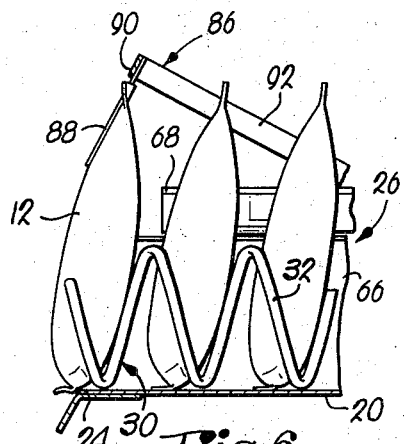
Fig.6.
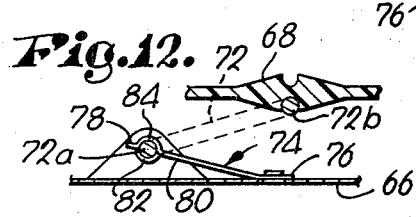
Fig.12.
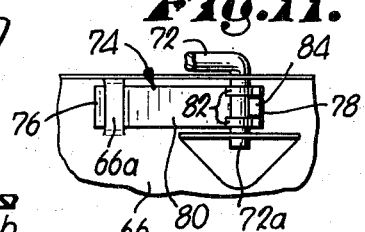
Fig.11.
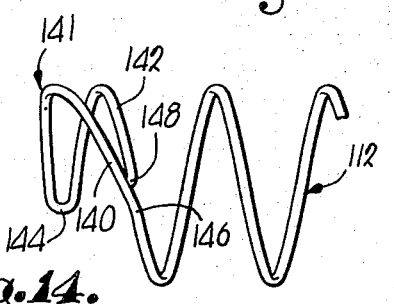
Fig.14.

SHELF APPARATUS FOR HELIX TYPE PRODUCT DISPENSING MACHINES

This invention relates to improvements in general merchandising machines of the type illustrated in U.S. Letters Pat. No. 3,653,540 to Offutt on Apr. 4, 1972, and U.S. Pat. No. 3,737,071 to Offutt, et al. More particularly, this invention relates to improvements associated with the helix-type, product dispensers of such machines.

General purpose merchandising machines that can handle a vast assortment of products including snack items such as potato chips, sweet rolls, and candy; personal items such as hosiery, handkerchiefs, and combs; and other miscellaneous items such as playing cards have steadily increased in demand in recent years. Manifestly, a merchandising machine which can accommodate such a wide range of products must be extremely flexible so that various products can be interchanged or substituted for one another as required, and this can be a substantial problem when consideration is given to the multitude of packaging forms, sizes and shapes which the various products can assume.

Helix-type dispensers wherein the products are inserted within spaces between adjacent convolutions of the helix and are advanced toward a discharge point when the helix is rotated about its longitudinal axis offer an inherent degree of flexibility because the spaces between the convolutions of the helix will accept products of many different sizes. Moreover, the helixes can be used either singly or in combination depending upon the characteristics of the product being dispensed. However, even the highly flexible helix-type dispensers operate more effectively without misfeeding where provisions are made to accommodate drastic changes in the shapes and sizes of products being dispensed by the helixes.

Accordingly, one important object of the present invention is to provide improvements that enable helix-type dispensers of otherwise standard design to handle a wider variety of products than heretofore possible.

Another important object of this invention is to provide helix-type dispensers wherein adjustments for preparing the dispenser to handle a new product having different characteristics than the new one previously dispensed can be quickly and easily made by even inexperienced personnel.

It is an additional important object of the instant invention to provide a helix-type dispenser than can operate with a minimum of clearance space between its discharge end and the cabinet wall assembly of the merchandising machine without jamming of the products within the drop space, hence permitting a greater portion of the cabinet space to be devoted to products.

In connection with the foregoing object, some products are so designed that they have a tendency to tumble when dispensed into the drop space, hence increasing the liklihood that such products will bridge the space and refuse to drop. Accordingly, it is a further object of this invention to assure that products ejected by the helical dispenser do not tumble through the drop space after leaving the dispenser, in order to eliminate any possibility of jamming the drop space.

Another important object of the present invention is the provision of a helix-type dispenser wherein the helix can be readily disconnected from its drive and indexed to a selected rotative position in order to relocate the discharge terminus of the helix with respect to the beginning and end of the operating cycle of the helix. Such adjustment is important because certain products are so narrow that unless the helix terminus is properly positioned with respect thereto, the products can slip past the terminus without acutation of the helix, hence inviting jackpotting of the machine.

Other objects of the instant invention will become clear or made apparent from the following description and the drawings, wherein:

FIG. 6 is a fragmentary essentially cross-sectional view taken vertically through the front of the drawer assembly illustrating the function of the deflecting bail thereof;

FIG. 7 is an enlarged, fragmentary, vertical cross-sectional view of the coupling located at the rear of the drawer assembly which permits indexing of the helixes, the released position of the coupling being indicated in dashed lines;

FIG. 8 is a top plan view of a second drawer assembly of the dual-helix, dual product type adapted for dispensing a product with each helix;

FIG. 9 is a front end elevational view of the drawer assembly of FIG. 8, the dashed lines indicating the outlines of products loaded within the assembly;

FIG. 10 is an enlarged, fragmentary cross-sectional view taken along line 10—10 of FIG. 2 and showing details of the adjustable structure for varying the width of the dispensing compartment of a drawer assembly;

FIG. 11 is a fragmentary cross-sectional view of the chamber width adjusting structure taken along line 11—11 of FIG. 10;

FIG. 12 is an enlarged, fragmentary cross-sectional view of the structure taken along line 12—12 of FIG. 2;

FIG. 13 is an enlarged plan view of the terminal portion of the helixes associated with the drawer assembly of FIG. 8 illustrating the nature of the product ejector means of the terminal portion; and FIG. 14 is a fragmentary plan view of a helix utilizing a second form of product ejector means.

Figure 1:
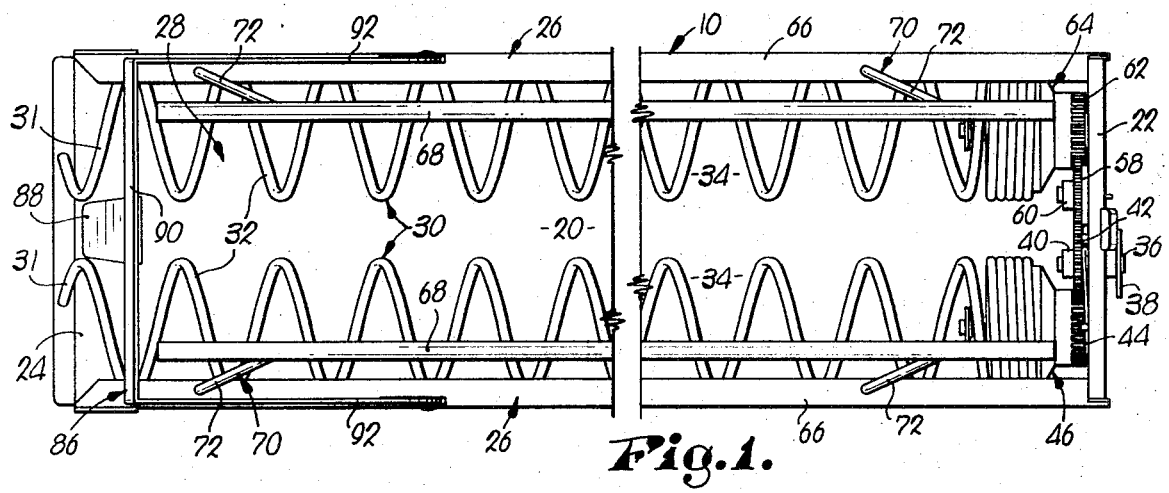
FIG. 1 is a top plan view of a dual-helix, single product dispensing drawer assembly employing certain of the principles of the present invention.
Figure 2:
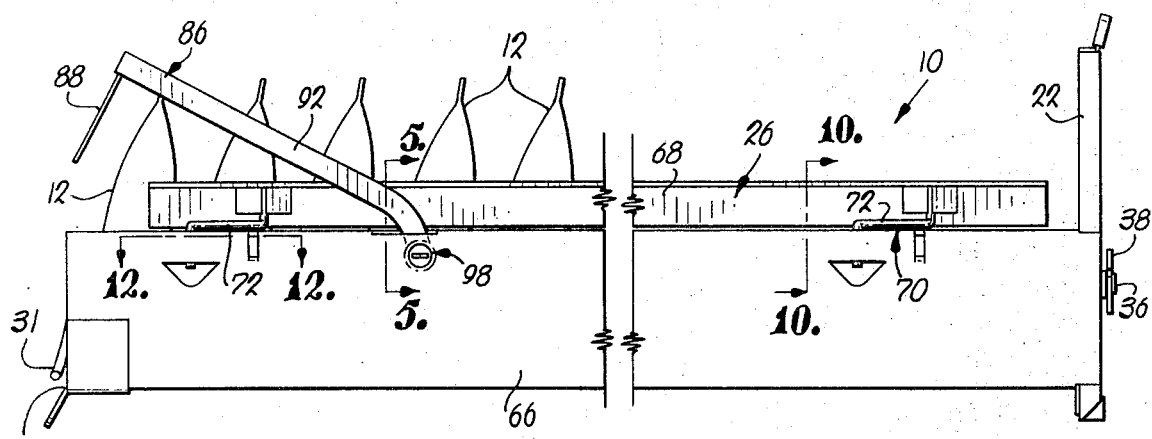
FIG. 2 is a side elevational view thereof provided with soft pack, snack items.
Figure 3:
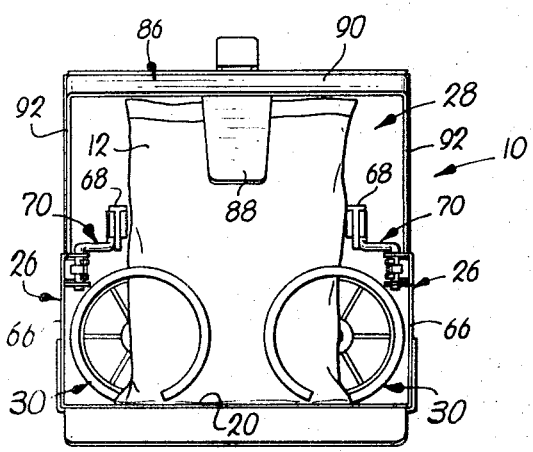
FIG. 3 is a front end elevational view of the loaded drawer assembly.
Figure 4:
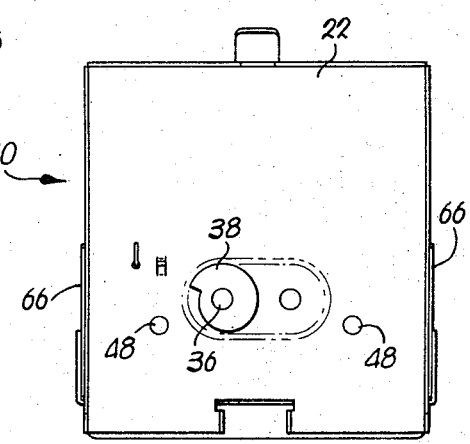
FIG. 4 is a rear end elevational view of the drawer assembly.

The drawer assembly 10 of FIG. 1 is of the dual helix-type designed for dispensing snack items such as soft packs 12 of potato chips and the like illustrated in FIGS. 2, 3 and 6. As will become apparent from the following material, many of the improvements disclosed herein apply equally to the dual-helix, single product drawer assembly 10 of FIG. 1 and the dual-helix, dual product drawer assembly 14 of FIG. 8 which accommodates firmer, more definitely shaped hard packs 16 and 18 of candy bars and the like as shown in FIG. 9. Other improvements are designed for use primarily with only one of the drawer assemblies 10, 14 instead of both, and such will be made clear as the description progresses.

Dealing first with the drawer assembly 10, the latter includes a flat floor or shelf 20 having a closed inner end bounded by an upright rear wall 22 and an open, front discharge end 24. A pair of laterally spaced apart, upright sidewall structures 26 rise from shelf 20 to define a product receiving compartment 28 therebetween and above shelf 20. Within compartment 28 are a pair of elongated conveying or feeding helixes 30, each of which has a plurality of spaced apart convolutions 32 defining therebetween product receiving spaces 34 that extend from the discharge end 24 of shelf 20 toward the rear wall 22. Each helix 30 is provided with a terminal portion 31 adjacent end 24, and while the helixes 30 are identical to one another in the above respects, they are reversely coiled with respect to each other and rotate in opposite directions during operation as will hereinafter be described in detail.

The rear wall 22 of assembly 10 rotatably carries an input driven shaft 36 having a cam 38 mounted thereon for rotation therewith on the exterior of wall 22. Shaft 36 projects through rear wall 22 into compartment 28 and carries a gear 40 whose teeth 42 mesh with teeth 44 of a conical coupler 46 (details in FIG. 7) mounted for rotation upon a normally horizontally extending spindle 48 projecting forwardly from rear wall 22. The enlarged portion 50 of coupler 46 has a number of the closely spaced convolutions 32 of the corresponding helix 30 wrapped about its periphery so that the coupler 46 and its helix 30 rotate in unison in response to rotation of cam 38.

The coupler 46 has a hollow, concave interior provided with a hub 52 that receives spindle 48. The hub 52 slideably as well as rotatably receives spindle 48 so that coupler 46 can be moved between its full line and dashed line positions indicated in FIG. 7, the dashed line position of coupler 46 indicating a condition in which the teeth 44 thereof have been moved along spindle 48 out of mesh with teeth 42 on gear 40. A compression spring 54 coiled about spindle 48 exteriorly of hub 52 is confined between the latter and a keeper 56 at the outermost tip of spindle 48 so as to yieldably bias coupler 46 into its normal, operating engagement with gear 40.

The opposite side of gear 40 meshes with the teeth 58 of an intermediate gear 60 also rotatably carried by rear wall 22, the teeth 58 of intermediate gear 60 in turn meshing with the teeth 62 of a second coupler 64 that is identical in all respects to the coupler 46. Moreover, the function of coupler 64 with respect to its helix 30 is precisely the same as that of coupler 46 with respect to its helix 30. Through the provision of the intermediate gear 60, the coupler 64 is caused to rotate in a direction opposite that of the coupler 46, the latter being directly driven by input gear 40.

While not shown in the drawings, it is to be understood that the cam 38 may be driven by any suitable means located at the rear of the merchandising cabinet within which drawer assembly 10 is located. One possible form of such drive is fully disclosed in the aforementioned U.S. Pat. No. 3,653,540, and reference may be made thereto for a full and clear explanation of such drive, which forms no part of the present invention.

Sidewall structure 26 includes a lower main section 66 rigidly affixed to the floor 20 and a laterally shiftable, elongated section 68 for working in combination with the opposite shiftable section 68 to adjust the width of compartment 28. Each shiftable section 68 extends substantially the total length of compartment 28 and is swingably supported as detailed in FIG. 10 by parallel linkage 70 including a pair of links 72, each of the latter being generally Z-shaped having one leg 72a thereof pivotally carried by the stationary main wall section 66 and the other leg 72b thereof pivotally secured to the swingable section 68.

The swingable sections 68 are held in their selected lateral positions overlying the compartment 28 by friction, and such is provided by a spring clip 74 detailed in FIGS. 10, 11 and 12. One end 76 is fixed to the main wall section 66 beneath a raised strip 66a thereof, while the opposite end 78 of clip 74 is disposed outwardly from wall section 66 by virtue of the body 80 of clip 74 being angled outwardly away from main wall section 66 as end 78 is approached. The outer end 78 is provided with a pair of spaced gripping fingers 82 that work in opposition to a single gripping finger 84 to tightly yet yieldably confine the leg 72a of the link 72.

The drawer 10 is also provided with means for deflecting the soft packs 12 as they are advanced by helixes 30 off discharge end 24 of shelf 20, such means including a deflector bail 86, generally U-shaped, that is looped above compartment 28 and is provided with a resilient deflector tongue 88 projecting downwardly from the bight 90 of bail 86. The opposed legs 92 of bail 86 are swingably mounted on the corresponding main wall sections 66 as detailed in FIG. 5, with the legs 92 being frictionally held in selected vertical positions to adjust the position of tongue 88 with respect to the packs 12. In this latter respect, the tongue 88 should be positioned to engage the upper extremities of packs 12 as shown in FIGS. 2 and 6 as the packs 12 approach discharge end 24.

Figure 5:
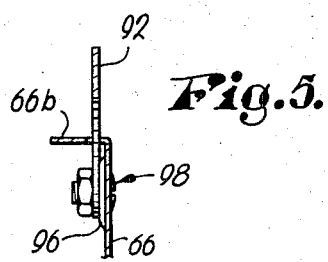
FIG. 5 is an enlarged, fragmentary cross-sectional view taken along line 5—5 of FIG. 2 at one corner of the deflecting bail of the drawer assembly.

With reference to FIG. 5, each leg 92 of bail 86 extends through an elongated slot 94 formed in an inturned ledge 66b of main wall sections 66 to clear leg 92 during vertical swinging thereof and is tightly yet yieldably clamped against a boss 96 on wall section 66 by virtue of a pivot bolt assembly 98 for the leg 92.

Referring now to the drawer assembly 14, its manner of construction and use is quite similar to that of assembly 10, with certain provisions made for the dispensing of either of the two product choices 16 and 18 rather than a single product choice 12 as with drawer assembly 10. Drawer assembly 14 has a pair of identical product compartments 100 presented by the two outer sidewall structures 102 and a central wall structure 104 therebetween, all of the structures 102, 104 having a common floor or shelf 106 and a common, upright rear wall 108. In view of the two separate compartments 100 presented by drawer assembly 114, the common floor or shelf 106 has a pair of side-by-side discharge ends 110, one for each compartment 100, and each cooperating with a feeding conveyer or helix 112 for dispensing the product packs 16 and 18.

The right outermost sidewall structure 102 (viewing FIG. 9) is provided with a swingable, width determining section 114, as is the central wall structure 104. Inasmuch as the swingable sections 114 are identical to the sections 68 of drawer assembly 10, they will not again be described in detail. Suffice it to say that, as illustrated best in FIG. 9, the swingable sections 114 may be set in any one of a number of selected positions overlying their helixes 112 and their compartments 100 to limit the effective widths of the latter in accordance with the width of the products 16 and 18 located within compartments 100.

The helixes 112 are identical to one another and to the helixes 30 of drawer assembly 10, although it will be seen that both helixes 112 are coiled in the same direction, while the helixes 30 are coiled in opposite directions. The helixes 112 are operable independently of one another through a cam 116, a gear 118, and a coupler 120, all of which are identical to the cam 38, gear 40 and coupler 46 of drawer assembly 10. Moreover, each coupler 120 is spring-loaded in the same manner as couplers 46 and 64 of drawer assembly 10 so that the helixes 112 can be individually indexed.

In order to prevent the product packs 16 and 18 from tumbling as they are pushed off discharge ends 110 by helixes 112, the drawer assembly 14 is provided with deflector means in the nature of a pair of resilient deflecting fingers 122 that project laterally from the left sidewall structure 102 (viewing FIG. 9) and from the central wall structure 104 into the compartments 100. The fingers 122 project sufficiently into compartments 100 to be disposed within the paths of travel of the product packs 16 and 18 as the latter approach discharge ends 110, and the fingers 122 are located sufficiently near the upper margins of sidewall and central wall structures 102 and 104 respectively to engage the product packs 16 and 18 above the midpoints of the latter.

The helixes 112 may also be provided with either of two special terminal portions that are illustrated in FIGS. 13 and 14 and are designated broadly by the numerals 124 and 126 respectively. The terminal portion 124, illustrated in FIG. 13 and shown by way of example on the helixes 112, includes a molded ejector 128 of synthetic resinous material that is affixed to the final convolution 130 of portion 124 and is of substantially the same radius. The ejector 128 is essentially semicircular and has an inner bead-like segment 132 extending along and bonded to convolution 130, there being a web 134 projecting outwardly from sigment 132. The web 134 has an outermost, arcuate edge or surface 136 that departs angularly from the convolution 130 at a point spaced inwardly of the tip 131 of convolution 130 so that the surface 136 is presented to the discharge end 110 of floor 106 in rapidly increasing amounts as its helix 112 is rotated in a clockwise direction viewing FIG. 9. Preferably, as shown in FIG. 8, the surface 136 should project beyond the discharge end 110 at the completion of a dispensing cycle, overlying the inclined lip 138 of floor 106.

Viewing FIG. 14, it may be seen that the terminal portion 126 illustrated therein differs from terminal portion 124 just described in that terminal portion 126 comprises a loop having an outer stretch 140, an inner stretch 142, and a bight 144 therebetween. The outer stretch 140 departs from the normal attitude of the preceding convolutions at point 146 so as to present an ejector 141 for the products extending between point 146 and bight 144. The tip 148 of inner stretch 142 bears against the inner side of outer stretch 140 slightly beyond point 146 and may or may not be welded to outer stretch 140 as desired. Normally, such welding will not be necessary in view of the locating of tip 148 along the inside of outer stretch 140. Note that inner stretch 142 continues in the same line as the preceding convolutions.

OPERATION

When the drawer assemblies 10 and 14 are in place within a machine, their cams 38 and 116 are operatively controlled by mechanism at the rear of the machine cabinet as described in the aforementioned patent. If the customer selects a snack item 12 contained within drawer assembly 10, the helixes 30 thereof are rotated 360° in unison, but in opposite directions by cam 38 to advance the leading product 12 off the discharge end 24 and into the drop space of the machine. On the other hand, if the customer selects either the products 16 or 18 of drawer assembly 102, the appropriate cam 116 drives the helix 112 of the selected product 16 or 18 through a rotating cycle of 360° to advance the leading product 16 or 18 off discharge end 110 into the drop space.

As earlier mentioned, many of the improvement features herein disclosed can be applied equally to either of the drawer assemblies 10 and 14, while certain of the features are primarily intended for use only with one or the other of the drawer assemblies 10 and 14. For example, the spring-loaded couplers 46 and 64 of drawer assembly 10 have counterparts in the spring-loaded couplers 120 of drawer assembly 14, because it is important that the helixes 30 and 112 of both drawer assemblies 10 and 14 have the capability of accurate positioning of their terminal portions 31, 124, 126 as required to accommodate the specific size and shape of the product package being dispensed. Using drawer assembly 10 as an example, by pulling outwardly on the helixes 30, the couplers 46 and 64 can be disengaged from their driving gears 40 and 60 respectively against the action of their springs 54 (FIG. 7) to enable the helixes 30 to be rotated manually to the extent desired. It is then only necessary to release helixes 30, whereupon the spring 54 return the couplers 46 and 64 into meshing engagement with their gears 42 and 60. The helixes 30 are thus once again in condition to be driven through an operating cycle when cam 38 is rotated.

It will be appreciated that rather large packages of food products such as illustrated by the soft packs 12 may be handled rather easily without need for indexing the helixes 30. However, when products of lesser dimensions are to be fed using the helixes 30 in unison, it can be appreciated that the location of the terminal portions 31 of the helixes 30 at the beginning and ends of their operating cycles can be important. Viewing FIG. 3 it may be seen that the terminal portions 31 of the helixes 30 are so positioned that the leading pack 12 is well confined against accidental release. However, if in lieu of pack 12 a smaller package having less width than pack 12 were to be fed and the terminal portions 31 were not properly located, the smaller package could slip from the helixes 30 without the latter being actuated. Hence the importance of the indexability of helixes 30 becomes apparent.

Of course, the same is true with the drawer assembly 14, and perphaps even more so, because herein only a single helix is used to control each product package 16 or 18. Note that the product packages 16 and 18 are relatively tall and narrow and hence have a tendency to slip from the control of the helixes 112 at discharge ends 110 unless the terminal portions 124 or 126 are properly indexed.

The drawer assemblies 10 and 14 also have in common the width adjusting sections, denoted by the numeral 68 in drawer assembly 10 and by the numeral 114 in drawer assembly 14. They serve the same function in both assemblies 10 and 14 and may be quickly and easily set to the desired position by virtue of the friction retaining means detailed in FIGS. 10–12. In drawer assembly 10, the sections 68 are moved inwardly to lightly engage opposite lateral edges of the packs 12, so as to properly center the latter between the helixes 30. In drawer assembly 14, the sections 114 are also moved inwardly until they engage the proximal side edges of the packs 16 and 18, but here the sections 114 cooperate with the opposed wall structure 104 or 102 of the respective compartments 100 to properly confine the packs 16 and 18 rather than cooperating with a second swingable section as in drawer assembly 10. It is to be noted that because these sections 68 and 114 are disposed at higher elevations than the helixes 30 and 112, sections 68 and 114 in no way interfere with helixes 30, 112 during operation of the latter.

The drawer assemblies 10 and 14 also have in common the use of deflector means to prevent tumbling of the products being dispensed. In the case of drawer assembly 10, the overhead bail 86 with its tongue 88 is employed to engage the top portions of the soft packs 12 as shown in FIG. 6 as they are advanced off discharge end 24. In drawer assembly 14, the deflector fingers 122 serve the same function, although engaging the packs 16 and 18 along the side margins of the fronts thereof rather than across the top extremities thereof.

The use of the deflectors 88 and 122 is important because they assure that products leaving drawer assemblies 10 or 14 and entering the drop space of the machine will not tumble, but instead will gravitate in the same orientation as they assumed while stored within the drawer assemblies 10, 14. Therefore, the width of the drop space can be minimized, it being necessary only to provide sufficient space to accommodate the thickest product package being dispensed, thereby providing greater space within the machine that can be made available for product storage. Hence, the frequency of restocking the machine can be decreased, while at the same time, the likelihood of products becoming clogged within the drop space can be substantially reduced.

It has been found that the need for an additional boost or push in order to assure that the products are fully dispensed into the drop space of the machine is most often felt where products having the characteristics of packs 16 and 18 are dispensed in contrast to those of the soft packs 12. Accordingly, while ejectors 128 and 141 could be provided on the helixes 30 of drawer assembly 10, they have been found to be of most help on helixes 112 of drawer assembly 14. Both types of ejectors 128 and 141 work equally well in assuring that a product is pushed into the product drop space, and both function in the same manner. Taking ejector 128 as an example, when a selected one of the helixes 112 is actuated to dispense its product 16 or 18, the ejector 128 is rotated clockwise viewing FIG. 9 so that the pack 16 or 18 located therebehind in the next preceding convolution space is advanced toward discharge end 110 and into position for engagement by the ejector 128. As the 360° cycle continues, the pack 16 or 18 is advanced sufficiently far that the angled surface 136 becomes progressively engaged with the pack 16 or 18, hence forcing the same along the bottom thereof outwardly beyond discharge end 110 into the drop space. It will be appreciated that because the pack 16 or 18 is located behind ejector 28 at the beginning of the operating cycle, the ejector 128 does not engage the product until the latter has been advanced sufficiently close to discharge end 110 for the ejector 128 to be nearing the final stages of its cycle. At such time, the ejector 128 engages the pack 16 or 18 at the bottom half thereof rather than along the top portion thereof, hence further decreasing the liklihood that the pack 16 or 18 will tumble into the drop space.

As earlier mentioned, the ejector 141 works in the same manner as ejector 128 and with equal success. As helix 112 is rotated 360°, the outer stretch 140, serving as ejector 141, progressively engages and pushes the bottom half of the leading pack 16 or 18 from a discharge end 110 into the drop space. Tumbling is thereby precluded.

It will be appreciated that minor modifications could be made in the features above presented by those skilled in the art without departing from the true spirit of the present invention. Accordingly, this invention should be limited only by the fair scope of the claims which follow.

Having thus described the invention what is claimed as new and desired to be secured by Letters Patent is:

1. In product dispensing apparatus:
means including a product shelf having a product-discharge end;
feeder means for advancing products along said shelf toward said discharge end and successively off the latter; and
deflector means adjacent said discharge end projecting into the path of travel of said products and disposed to engage the leading product at a point spaced substantially above said shelf as the leading product is advanced off said discharge end, whereby to prevent said leading product from tumbling as it leaves said discharge end,
said deflector means including a resilient tongue projecting downwardly into said path of travel of the products from above the same.

2. In product dispensing apparatus:
means including a product shelf having a product-discharge end;
feeder means for advancing products along said shelf toward said discharge end and successively off the latter; and
deflector means adjacent said discharge end projecting into the path of travel of said products and disposed to engage the leading product at a point spaced substantially above said shelf as the leading product is advanced off said discharge end, whereby to prevent said leading product from tumbling as it leaves said discharge end,
said deflector means including a resilient finger projecting laterally into said path of travel of the products from one side thereof.

3. In product dispensing apparatus:
means including a product shelf having a discharge end;
an elongated feeding helix overlying said shelf having a terminal portion adjacent said end, and having a plurality of spaced apart convolutions defining a series of product spaces therebetween;

means for rotating said helix in a direction to advance product located within said spaces along said shelf, toward said end, and successively off the end; and arcuate product ejector means associated with said terminal portion having substantially the same radius as the next preceeding convolution but provided with a product-engaging surface departing outwardly from said preceeding convolution in the axial direction of the latter for pushing the leading product off said end during rotation of said helix in said direction, said terminal portion having a tip disposed inwardly of said product-engaging surface of the ejector means, said terminal portion comprising a loop in said helix integral with the remainder of the helix, said loop having an inner and an outer stretch, said outer stretch presenting said ejector means.

4. In product dispensing apparatus as claimed in claim 3, wherein said tip of the terminal portion is on said inner stretch of the loop.

5. Product dispensing apparatus including:

means including an elongated product shelf and a pair of laterally spaced apart, normally upright product guide structures extending along said shelf, defining a product compartment above said shelf and between said structures, said shelf having a normally inner end and a normally outer discharge end;

at least one elongated, helical, product feeder overlying said shelf within said compartment and extending between said ends of the shelf, said feeder having a plurality of longitudinally spaced apart concentric convolutions defining a longitudinally extending series of product receiving spaces between the convolutions, said feeder being adapted for rotation about the common axis of said convolutions for advancing products disposed within said spaces along said shelf and toward said discharge end thereof during rotation of the feeder, said feeder having a terminal portion cooperable with said discharge end of the shelf during rotation of the feeder to dispense the leading product from said compartment over said discharge end;

drive means for the feeder at said inner end of the shelf; and a releasable coupling unit between said drive means and the feeder shiftable between a normal position operably interconnecting the drive means and the feeder and a released position allowing the feeder to be manually rotated to index said terminal portion to any selected one of a number of rotative dispositions, said terminal portion including transversely arcuate product ejector means substantially the same radius as the next preceeding convolution but having an outermost, product-engaging surface extending progressively away from said preceeding convolution in the axial direction of the feeder for pushing the leading product off said discharge end of the shelf during rotation of the feeder, said terminal portion comprising a loop in said feeder having an inner and an outer stretch, said outer stretch presenting said ejector means.

6. Product dispensing apparatus as claimed in claim 5, wherein said unit is provided with yieldable means biasing the unit toward said normal position.

7. Product dispensing apparatus as claimed in claim 5, wherein said inner stretch of the loop has a tip end.

8. Product dispensing apparatus as claimed in claim 5, wherein said drive means and said unit are provided with mating gear teeth, said teeth being out of mesh when the unit is in said released position.

9. Product dispensing apparatus as claimed in claim 8, wherein said unit is rotatable concentrically with said feeder and shiftable axially between said positions to place said teeth into and out of mesh.

10. Product dispensing apparatus as claimed in claim 9, wherein said unit is provided with yieldable means biasing said teeth into mesh.

11. Product dispensing apparatus as claimed in claim 5, wherein at least one of said structures includes an elongated section shiftable laterally with respect to said compartment for varying the effective width of the compartment.

12. Product dispensing apparatus as claimed in claim 11, wherein said section is provided with parallel linkage for swinging the section between its adjusted dispositions.

13. Product dispensing apparatus as claimed in claim 2, wherein said linkage is provided with friction means for yieldably holding the linkage and hence said section in a selected, adjusted disposition.

14. Product dispensing apparatus including:

means including an elongated product shelf and a pair of laterally spaced apart, normally upright product guide structures extending along said shelf, defining a product compartment above said shelf and between said structures, said shelf having a normally inner end and a normally outer discharge end;

at least one elongated, helical, product feeder overlying said shelf within said compartment and extending between said ends of the shelf, said feeder having a plurality of longitudinally spaced apart concentric convolutions defining a longitudinally extending series of product receiving spaces between the convolutions, said feeder being adapted for rotation about the common axis of said convolutions for advancing products disposed within said spaces along said shelf and toward said discharge end thereof during rotation of the feeder, said feeder having a terminal portion cooperable with said discharge end of the shelf during rotation of the feeder to dispense the leading product from said compartment over said discharge end;

drive means for the feeder at said inner end of the shelf; and a releasable coupling unit between said drive means and the feeder shiftable between a normal position operably interconnecting the drive means and the feeder and a released position allowing the feeder to be manually rotated to index said terminal portion to any selected one of a number of rotative dispositions, said compartment being provided with deflector means projecting into the normal path of travel of products within the compartment in disposition to engage the leading product at a point spaced substantially above said shelf as the leading product is advanced off said discharge end, whereby to prevent tumbling of the leading product, said deflector means including a bail spanning said compartment and swingably supported by said structures for height adjustment, said bail being provided with a resilient tongue for contacting the products.

15. Product dispensing apparatus including:

means including an elongated product shelf and a pair of laterally spaced apart, normally upright product guide structures extending along said shelf, defining a product compartment above said shelf and between said structures, said shelf having a normally inner end and a normally outer discharge end;

at least one elongated, helical, product feeder overlying said shelf within said compartment and extending between said ends of the shelf, said feeder having a plurality of longitudinally spaced apart concentric convolutions defining a longitudinally extending series of product receiving spaces between the convolutions, said feeder being adapted for rotation about the common axis of said convolutions for advancing products disposed within said spaces along said shelf and toward said discharge end thereof during rotation of the feeder, said feeder having a terminal portion cooperable with said discharge end of the shelf during rotation of the feeder to dispense the leading product from said compartment over said discharge end;

drive means for the feeder at said inner end of the shelf; and a releasable coupling unit between said drive means and the feeder shiftable between a normal position operably interconnecting the drive means and the feeder and a released position allowing the feeder to be manually rotated to index said interminal portion to any selected one of a number of rotative dispositions, said compartment being provided with deflector means projecting into the normal path of travel of products within the compartment in disposition to engage the leading product at a point spaced substantially above said shelf as the leading product is advanced off said discharge end, whereby to prevent tumbling of the leading product, said deflector means including a bail spanning said compartment and swingably supported by said structures for height adjustment, said bail being provided with means for frictionally holding the bail in a selected vertical position.

16. Product dispensing apparatus including:

means including an elongated product shelf and a pair of laterally spaced apart, normally upright product guide structures extending along said shelf, defining a product compartment above said shelf and between said structures, said shelf having a normally inner end and a normally outer discharge end;

at least one elongated, helical, product feeder overlying said shelf within said compartment and extending between said ends of the shelf, said feeder having a plurality of longitudinally spaced apart concentric convolutions defining a longitudinally extending series of product receiving spaces between the convolutions, said feeder being adapted for rotation about the common axis of said convolutions for advancing products disposed within said spaces along said shelf and toward said discharge end thereof during rotation of the feeder, said feeder having a terminal portion cooperable with said discharge end of the shelf during rotation of the feeder to dispense the leading product from said compartment over said discharge end;

drive means for the feeder at said inner end of the shelf; and a releasable coupling unit between said drive means and the feeder shiftable between a normal position operably interconnecting the drive means and the feeder and a released position allowing the feeder to be manually rotated to index said terminal portion to any selected one of a number of rotative dispositions, said compartment being provided with deflector means projecting into the normal path of travel of products within the compartment in disposition to engage the leading product at a point spaced substantially above said shelf as the leading product is advanced off said discharge end, whereby to prevent tumbling of the leading product, said deflector means comprising a resilient finger on at least one of said structures and projecting laterally therefrom into the compartment.

* * * * *

Disclaimer 3,840,147.—*Wilbert O. O'Neal* and *Burford J. Page*, Independence, Mo., and *Charles E. Simek*, Overland Park, Kans. SHELF APPARATUS FOR HELIX TYPE PRODUCT DISPENSING MACHINES. Patent dated Oct. 8, 1974. Disclaimer filed Apr. 12, 1976, by the assignee, *The Vendo Company*.

Hereby enters this disclaimer to claim 1 of said patent.

[*Official Gazette June 1, 1976.*]